(No Model.) 4 Sheets—Sheet 1.
J. A. & G. M. BRILL.
MOTOR TRUCK FOR CARS.
No. 425,653. Patented Apr. 15, 1890.
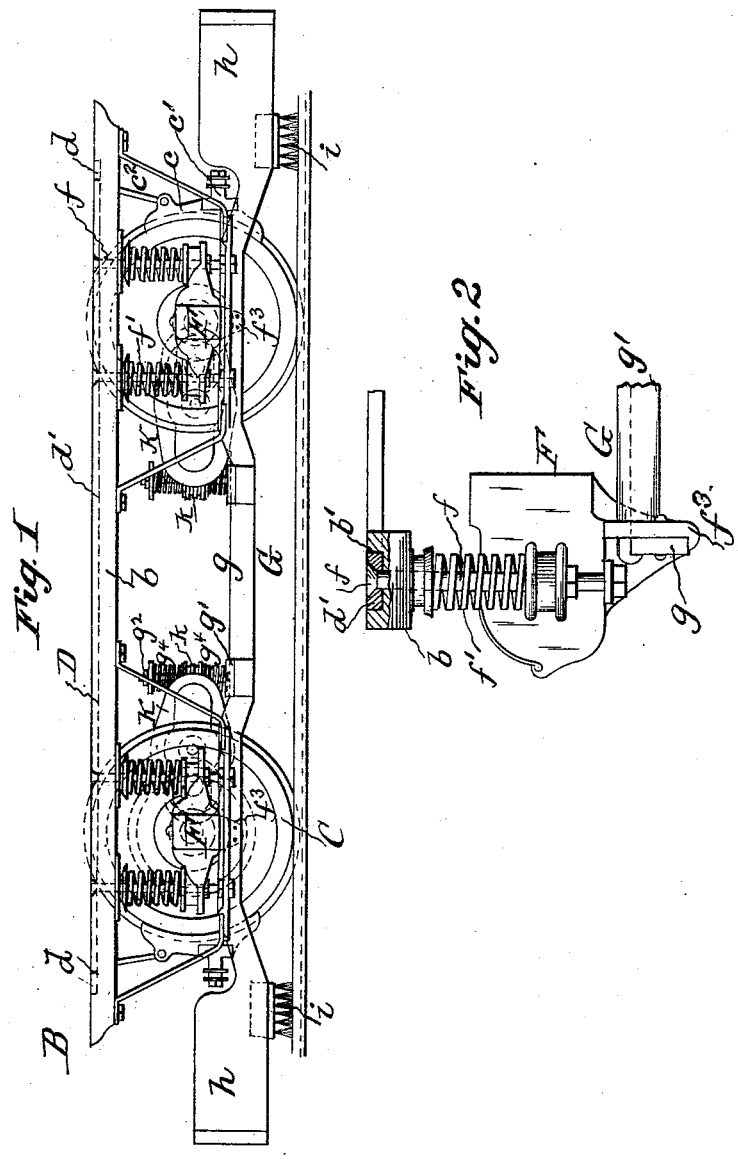
WITNESSES:
INVENTORS,
John A Brill
George M. Brill
per J. Van Stavoren
ATTORNEY (No Model.) 4 Sheets—Sheet 2.
J. A. & G. M. BRILL.
MOTOR TRUCK FOR CARS.
No. 425,653. Patented Apr. 15, 1890.
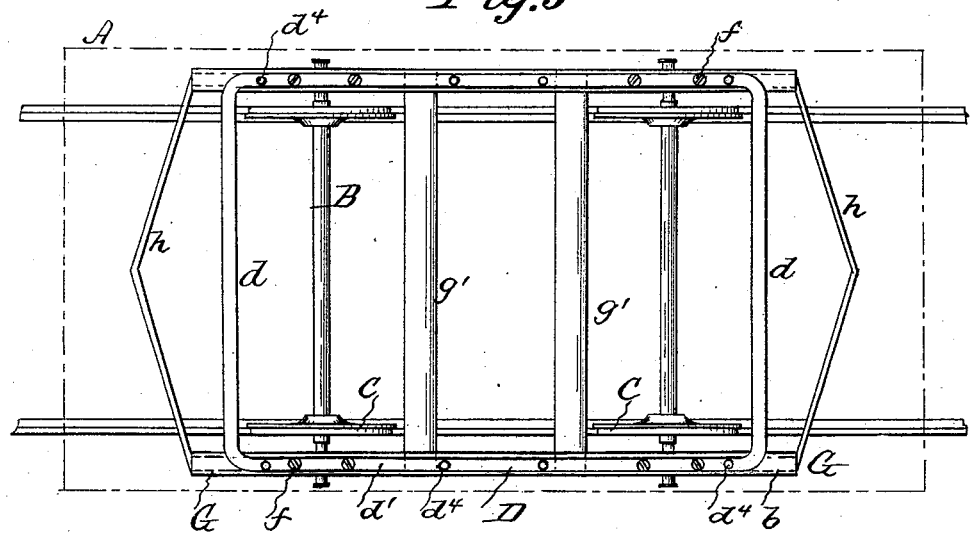
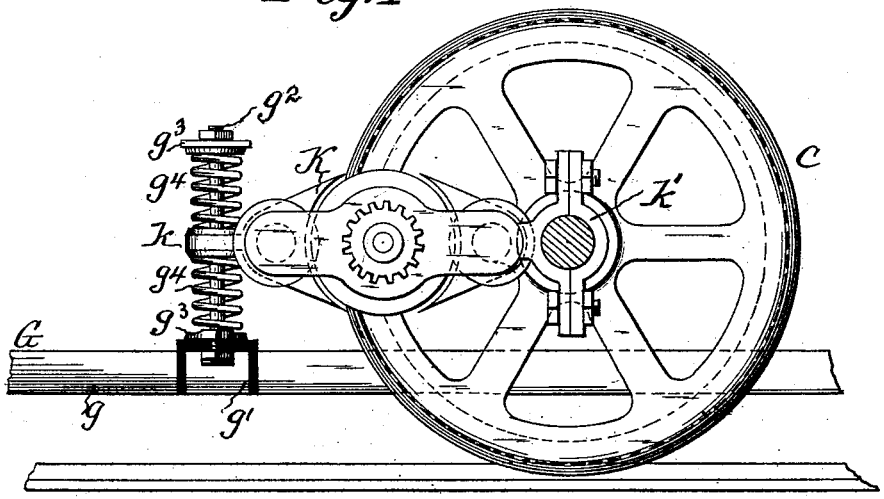

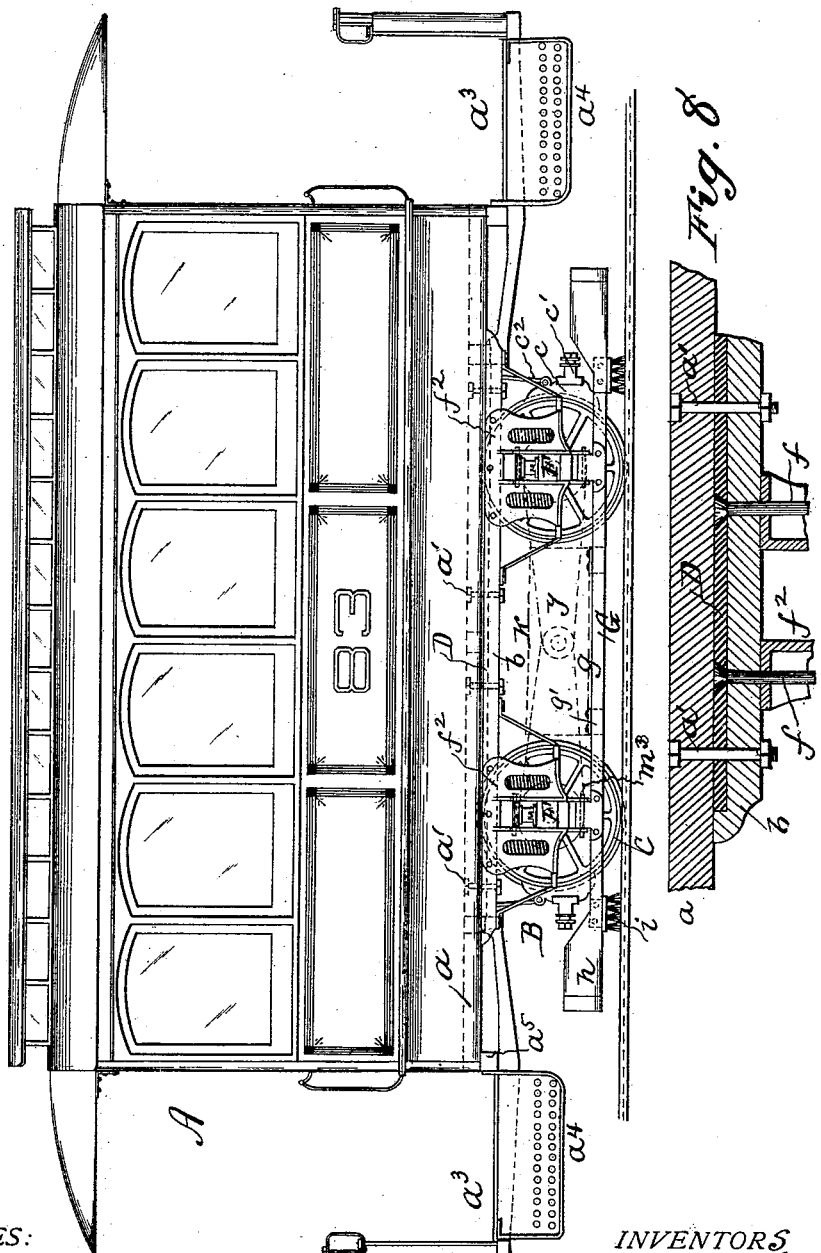

(No Model.) 4 Sheets—Sheet 4.
J. A. & G. M. BRILL.
MOTOR TRUCK FOR CARS.
No. 425,653. Patented Apr. 15, 1890.
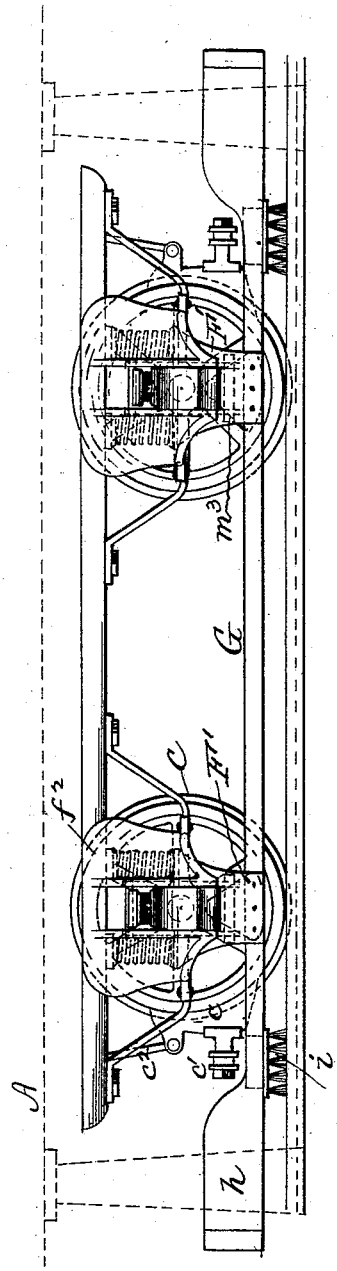
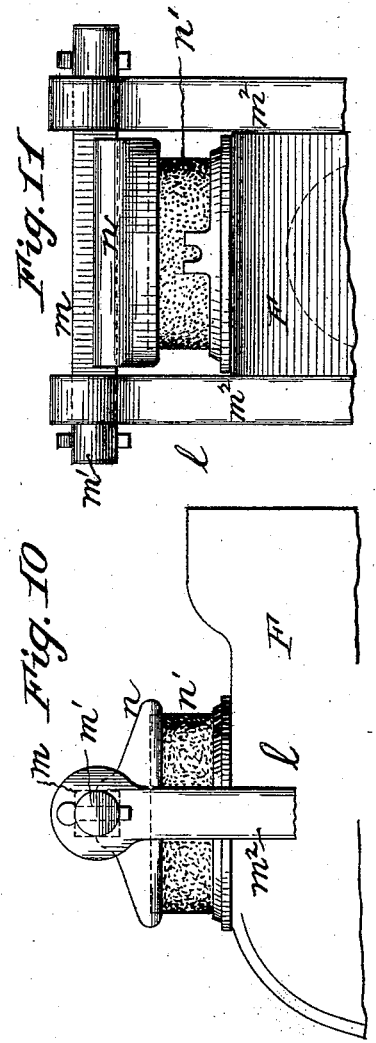
WITNESSES:
INVENTORS,
John A. Brill
George M. Brill
By J. Van Stavoren
ATTORNEY

UNITED STATES PATENT OFFICE.

JOHN A. BRILL AND GEORGE M. BRILL, OF PHILADELPHIA, PENNSYLVANIA.

MOTOR-TRUCK FOR CARS.

SPECIFICATION forming part of Letters Patent No. 425,653, dated April 15, 1890.

Application filed June 25, 1888. Serial No. 278,160. (No model.)

*To all whom it may concern:*

Be it known that we, JOHN A. BRILL and GEORGE M. BRILL, citizens of the United States, residing at Philadelphia, in the county of Philadelphia and State of Pennsylvania, have invented certain new and useful Improvements in Electric-Motor Railway-Cars, of which the following is a specification.

Our invention has relation to street-railway cars and their running-gear.

Street-railway cars as heretofore constructed have end platforms with depending side steps, which are located within the width of the car-body or do not project beyond the sides of the same, and the running-gear, consisting of two pairs of wheels, is located intermediate of the ends of the car-body, the pairs of wheels being equidistant from the transverse center or other like line of the car-body and have their axle-boxes mounted in or on pedestals secured to the longitudinal sills of the car-body. This central location of the running-gear results in overhanging car ends, which have considerable lateral sway or movement in addition to their vertical vibratory movements, which tend to throw the car off of the track unless the running-gear is firmly and properly secured to the car-body, and to this end the pedestals for each pair of wheels must be attached to the car-body sills so that their vertical centers align with the center line of the axles, and, further, said pedestals of both pairs of wheels must be square with one another in order to secure and maintain the parallelism of both axles at right angles to the track-rails, which parallelism and right-angled location of the axles makes the car ride smoothly and easily and prevents it being run off of the track-rails by the lateral and other movements of its overhanging ends.

The squaring of the pedestals on the car-body sills is practically the most important piece of work in the construction of the car, as it controls the running of the car and its maintenance on the track-rails.

To secure the pedestals to the car-body sills, so as to be square with one another, necessitates, first, a careful construction of the rectangular bottom frame for the car-body, of which frame the longitudinal sills are the sides, so that its angles are square and its sides or the sills are parallel; second, the laying out on said frame on opposite sides of its transverse center or other like selected line, the square for locating the pedestals, and third, securing the pedestals to the longitudinal sills so that they will exactly occupy their square position or relation. This is a work which requires very considerable time and care and expertness in fastening the metal pedestals to the wooden sills to maintain their square relation.

Furthermore, it is well known among car-builders and those using the cars that though the pedestals on new cars are always square and the cars run easily and smoothly and keep on the tracks, yet, owing to the longitudinal sills at the parts thereof to which the pedestals are attached being directly subject to the torsional and other strains incident to the reaction of the car-springs supporting at said parts the weight of the car-body and its load and to the lateral swaying and vibrations of the car-body, as well as to the end-thrust of the axles and their boxes, said sills gradually spring or spread apart and correspondingly move the pedestals out of their square relation and destroy the parallelism of the axles at right angles to the track-rails and the draft, which latter falls directly upon the car-body. This gradual unsquaring of the pedestals results in the car correspondingly riding harder and harder until it eventually easily and frequently leaves the tracks, whereupon it must be sent to the repair-shop to have its pedestals resquared. This described tendency of the sills to spread apart limits the duration of time during which the cars will ride easily and smoothly, for as soon as the sills begin to spread and the pedestals get out of square the flanges of the wheels grind against the track-rails to make the cars ride harder, and such grinding action also causes a deterioration of the wheels and rails. The above-described vibrations of the car-body also cause the pedestal bolts or fastenings to work in their sill-openings to loosen the hold of the pedestals thereon, so that moisture or rain gains access to said openings and to that part of the sills back of the pedestals and rots the wood, and in resquaring the pedestals it is often necessary to plug the openings in the sills and make new ones, or to remove that part of the sills on which the openings are located and insert a sound piece, or in many cases entire new sills have to be substituted before resquaring and resecuring the pedestals can be effected, all of which adds to the cost of maintenance of the cars, weakens the sills, and shortens their life or durability.

Again, in changing the running-gear of one street-car to another of the same or a different style the same skill, time, and care must be exercised in setting or squaring the pedestals, so that such work must be done in the shop, and the cars are laid by or are out of service while the change is being made.

Again, in applying electric or other motor appliances to street-cars as heretofore made the car-bodies are not sufficiently strong to support said motor appliances, and they are mounted upon the running-gear, which location experience has determined is the preferable one for obtaining the best available and most efficient working or operative results; but the application of these motors to the running-gear having its axle-box pedestals secured to the car-sills, as described, results, as is now well known, in increasing the tendency of the sills to spread apart and unsquare the pedestals, necessitating more frequent resquaring of the same, and as such motor appliances also need frequent repairs and replacement the cars must be out of service while the repairs are made, or else the running-gear must be removed therefrom and replaced by another, which necessitates resquaring of the pedestals when a new, a reserve, or the old gear with repaired motor is replaced thereon.

Again, in changing from a horse-car to an electric or other power motor system the old cars, owing to the rotting or deterioration of the sills, as above noted, are not available for use if the pedestals for the running-gear with the motor appliances mounted thereon are to be secured to the sills of the old cars; hence an entire new plant of cars with individual gear, as set forth, must be secured, and this adds greatly to the cost of plant required to make the change.

The object of our invention is to avoid all of the above-described objections, or, in other words, to so construct the running-gear and secure the pedestals therefor in position that the spreading of the car-sills to throw the pedestals out of square is entirely prevented; that the said sills are strengthened longitudinally as well as laterally; that the pedestals when once square remain so; that they, together with the running-gear, can be removed from one car and secured to another of the same or different style, or replaced upon the car from which they were removed without necessitating resquaring of the pedestals; that such removal and replacement or substitution can be effected in a very short time and at any convenient place; that old car-bodies are available for use when changing from a horse-power to an electric or other motor power system; that the said motor-power devices, together with the running-gear, may be removed from the car-body for repairs without taking it out of service while the repairs are being made, and that the running-gear, with the motor appliances, is not subject to the direct action of bumping, collision, or like strains when the cars are run singly or in trains. To the accomplishment of these ends we secure the running-gear and its pedestals to a rectangular frame, preferably of metal, which is bolted to the longitudinal sills of the car-body between its ends. By "car-body" we mean all that part of the car which is supported by the truck-frame, and we shall so refer to it hereinafter in the specification and claims. This frame is spring-supported on the axle-boxes preferably, and it, with the running-gear and the brake-shoes and their actuating mechanism, except the brake-handles on the car-platforms, forms a truck having a top frame with openings in its sides, and is separable from but rigidly secured to the car-body sills, so as to be removable therefrom when necessary, and when removed the pedestals remain intact on said frame and need no resquaring, thus admitting of changing the truck from one car to another or from a summer to a winter car, or reversely, which change may be made in the depot or other suitable place, and which provides for the use of but one set of trucks for two different sets of cars run at different seasons of the year, thus effecting a saving in the cost plant for equipping a line and prevent deterioration of the trucks and the motor appliances thereon by reason of non-use.

Our invention accordingly consists of the combinations, constructions, and arrangements of parts, as hereinafter described in the specification, and pointed out in the claims.

Reference is had to the accompanying drawings, wherein—

Figure 1 is a side elevation of a truck embodying our improvements, showing the truck separated from the car-body and having a post form of axle-box supports, the axle-boxes being provided with lugs or brackets, to which are secured the motor, brake-shoes, track-brush, and life-guard-supporting frame. Fig. 2 is a detail side elevation, partly in section, drawn to an enlarged scale, of one of the axle-boxes and part of the truck-frame and frame on the axle-boxes shown in Fig. 1. Fig. 3 is a plan of the truck. Fig. 4 is a sectional elevation, drawn to an enlarged scale, of one of the axles and wheels, part of the frame on the axle-boxes, and electrical motor, showing the latter supported at one end on the axle and having a yielding or spring-supported connection at its other end with the frame on the axle-boxes. Fig. 5 is a detail section showing modified arrangement or construction of yielding connection for the electric motor with the frame on the axle-boxes. Fig. 6 is a side elevation of same, partly sectional. Fig. 7 is an elevation of car-body and truck secured thereto, showing form of axle-box having spring-seats and a yoke-connection for the frame on the axle-boxes. Fig. 8 is a detail sectional view of part of one of the sill-pieces of the car-body, part of the truck-frame, and one of the axle-box pedestals or guide-posts, illustrating the preferable manner or way of securing said parts together, so that the truck may be rigidly affixed to the car-body so as to be removable therefrom. Fig. 9 is a view similar to Fig. 1, showing a form of axle-box having a yoke and stirrup with spring-supports, axle-box-frame connected to said stirrups, and indicating by dotted lines the car-body "jacked" or raised from the truck to admit of its removal and replacement. Figs. 10 and 11 are respectively a side elevation and a front view of an axle-box partly broken away and drawn to an enlarged scale, showing more plainly the construction of the yoke or link connection and its bearing on the axle-box for the axle-box frame.

A represents the car-body of a street-railway car, having the usual open or other constructed platforms $a^3$ at each end.

B represents the independent or separable truck, having, preferably, two pairs of wheels C C. The truck B consists of a rectangular top frame D, the sides $d'$ $d'$ and the ends $d$ $d$ of which are preferably made of strap-iron in one piece. They may, however, be made of channel-iron or other suitable material and constructed or connected together as desired. In all cases we prefer to have the frame D of such thickness that while it has the necessary strength and rigidity for purposes hereinafter described, yet will but slightly raise the car-body above the distance it heretofore stood from the tracks, in order to avoid the necessity of changing the position or lowering the car-steps when the truck is applied to cars already in use.

If desired, wooden side beams $b$ $b$ may be secured to the under surfaces of the sides of frame D, and when this is done we prefer to groove or recess the upper surfaces of the beams $b$ $b$, as indicated at $b'$, Fig. 2, to receive the side bars $d'$ $d'$ of frame D and bring its upper surface flush with the top surfaces of the beams $b$ $b$, as more plainly shown in Figs. 1, 2, and 3. These wood or other separable beams $b$ $b$ are preferably used when the cast-metal pedestals $f^2$ for the axle-boxes are employed, (see Fig. 7,) in order to give proper support or bearing on said frame D for said pedestals, and also to admit of the lateral bolt-connections usually employed for said pedestals. When the post form of pedestal (shown in Fig. 1) is employed, if desired said beams $b$ $b$ may then be dispensed with, as they are then not essential.

The beams $b$ $b$ may be secured to the frame side bars $d'$ $d'$ in any desired way; but for convenience and economy we prefer to make use of the bolts or posts $f$ for the springs $f'$ or pedestals $f^2$, as shown more plainly in Figs. 1, 2, and 6. Said spring posts or guides $f$, as well as the axle-box pedestals $f^2$ when used, are wholly secured to frame D and have no connection with the car-body.

The brake-shoes $c$ are connected to the brake-beams $c'$, having the usual or other link-connection with the truck-beams $b$ $b$, or with the cross-bars $d$ $d$ or sides $d'$ $d'$ of frame D, if desired. Said brake-beams are connected together and have the usual or other actuating appliances, as is customary, so that all of said brake-shoes and their actuating mechanism, except the brake-rods on the platforms $a^3$, which rods are not shown in the drawings, are supported on the truck B.

We do not confine ourselves to any particular kind of brake-shoes nor their actuating mechanism, as in themselves they form no part of our invention. The truck B, it will be noted, therefore, is complete in itself, and the pedestals $f^2$ are squared thereon, and being bolted to the metal frame D, the same as in locomotive-work, they cannot of themselves spread apart to get out of square, and as the frame D is of metal and has ends or cross-bars $d$ $d$ it does not spread; hence the pedestals are firmly maintained in their squared relation to preserve the parallelism of the axles at right angles to the tracks and the draft.

The truck-frame D is firmly bolted to the longitudinal body-sills $a$ between the ends of the body by means of bolts $a'$, which pass down through openings in the sills and in the frame side bars $d'$ $d'$ and beams $b$ $b$, if the latter be used, and have lower end nuts, so that they can be removed in order to detach the truck from the car-body. Any number of bolts $a'$ may be used. In practice we find that three on each side is ample to secure the truck rigidly to the car-body for all conditions of service, and when so secured thereto the side bars $d'$ $d'$ of the truck-frame D longitudinally strengthen the sills $a$ $a'$, so that they are not as apt to spring or bend when the car is subject to violent vertical vibrations or when overcrowded on its platforms, and the cross or end bars $d$ $d$ connect the sills together and prevent them from spreading apart, and such being the case the pedestals remain in their square relation.

To remove the trucks B from the cars, the nuts on the bolts $a'$ are unscrewed and the body is jacked or raised from the truck, which is then run out from beneath the body. This can be done in a very short time and at any convenient place and by unskilled labor, as the pedestals on the frame D remain intact. As the pedestals are not secured to the car-sills, the usual openings therein for the pedestal bolt-connections are not made, and all rotting of the wood at such places is avoided and the life or durability of the sills is increased.

As the trucks B can so readily be attached to and removed from a car-body, it is evident that when summer and winter cars are used for different seasons of the year only one set of trucks for both series of cars need be obtained, as the trucks can be transferred from one set of cars to the other, as desired, which very materially decreases the cost plant. It is also evident that in changing from a horse to an electric or other motor power system the old cars having deteriorated sills can be utilized, as the truck-frame D will strengthen said sills both longitudinally and laterally, and this admits of a very material saving in cost plant in making the change. When the trucks are to be used for motive-power cars, additional frames may be secured to the truck in such manner as not to be subject to the action of the car-springs and which support either wholly or partly the motive-power devices.

In the drawings we have shown an additional frame G combined with the truck, which frame is secured to the axle-boxes F or to lugs $f^3$ thereon. (See Figs. 1 and 2.) Frame G is preferably composed of side bars $g$ and cross-bars $g'$, the latter of which are preferably located between the axles.

The frame G or its side and cross bars may be made of channel or other iron, and its parts are secured together and to the axle-box lugs $f^3$ when used in any situable manner.

Instead of securing the frame G to the axle-box lugs $f^3$, it may be pivoted, linked, or otherwise connected thereto or mounted thereon, so as to have more or less lateral movement independent of corresponding movement of the car, in which case various forms of yoke or link connections may be used.

In Fig. 7 we have shown the axle-boxes having spring-seats, pedestals $f^2$ therefor, and link-connections $l$ with frame G, as fully described, shown, and claimed in another pending application filed March 15, 1888, Serial No. 267,205.

In Fig. 9 the axle-boxes are shown without spring-seats, the lower part of the springs resting upon stirrups F', which have link-connections $l$ with the axle-boxes, and to which the frame G is secured, as shown, described, and claimed in United States Letters Patent dated February 15, 1887, No. 357,811.

Any suitable form of link-connection $l$ for frame G may be used; but we prefer that shown more plainly in Figs. 10 and 11, wherein said connection $l$ consists of an angular top bar $m$, having rounded or journal ends $m'$, resting in a grooved plate $n$, superposed upon a spring $n'$ on the top of the axle-box, and of link or yoke bars $m^2$, journaled at one end on the ends $m'$ of top bar $m$ and at their lower ends to the frame G, as shown at $m^3$, Fig. 7, or to the stirrup F', to which said frame G is secured, as indicated in Fig. 9.

The springs $n'$ between the yoke or link connections $l$ and axle-boxes are employed to provide elastic bearings for frame G, to take up or compensate for any vertical vibrations imparted to frame G when in service by the movement or hammering of the wheels on the rails, and hence said frame and appliances mounted thereon are not directly subject to the jarring or jolting due to the travel of the wheels on the rails.

The electric motor K may be secured to the truck in any desired manner and in any convenient position; but to support it partly upon the axles and partly upon the frame G, with a yielding or spring connection between the motor and frame G, we affix to the cross-bars $g'$ of the latter upright rods, links, or bolts $g^2$, having end washers $g^3$ and springs $g^4$, between the latter of which and surrounding rods or bolts $g^2$ one end of the motor K has a bearing, as more plainly shown at $k$, Fig. 4, so that said motor end has a spring-supported or yielding motion up and down to compensate for vibrations incident to travel of the car, the opposite end of the motor being journaled or sleeved at $k'$ upon a car-axle. The armature-shaft of the motor and the axle are in gear with each other, as is usual in the type of motor-mounting described and shown.

Instead of connecting the bolts, links, or rods $g^2$ to the fixed cross-bars $g'$, as described, said bolts or rods may be mounted or have bearings in the side bars $g$ of frame G, in which case the cross-bars $g'$ are not fastened to the frame side bars $g$, but to the upper ends of the links or bolts $g^2$, with the springs $g^3$ between the cross-bars $g'$ and the frame side bars $g$, the latter being then, preferably, of double or parallel bars with intervening spacing-blocks $x$, through which the links or rods $g^2$ pass. (See Figs. 5 and 6.) When this described construction is used, the end bearing $k$ of the motor is hinged or pivoted directly to the cross-bars $g'$ or to brackets affixed thereto.

Instead of supporting the motor partly upon the axle and partly upon frame G, it may be wholly supported upon frame G, in which case the motor is secured to the cross-bars $g'$, as indicated by dotted lines $y$, Fig. 7, and the armature-shaft has a belt or chain connection with the axle or axles, as desired.

The truck B, when constructed as described, with or without the frame G and the appliances supported thereon, is of a length shorter than that of the car-body and is located between the ends of the latter, and said body has the usual overhanging ends, and in all other respects is of the same construction as heretofore, except that the truck-frame D is employed and has the pedestals secured thereto. If in any case the use of the frame D elevates the steps $a^4$ on the platforms $a^3$ too far from the ground, then by inserting separate transverse bars $a^5$ between the car-sills and platform-supporting bars, the platforms are depressed to bring their steps $a^4$ to the usual position.

Any form of electric or other motor may be used with our improvements, and they or so much of them as is essential may be applied to cable cars. It will be evident, therefore, that when truck B is provided with frame G and the motor K all of the above-described advantages still exist, and, further, it admits of continuous use of the motors to keep up their efficient organization; that a faulty motor, with its truck, is readily removed and replaced by a new or reserved truck with like motor, so that the car is not laid by while the repairs to the motor are being made; that the truck and the motor thereon being located between the overhanging car ends, which directly receive the strains of bumping and collision, are protected as much as it is possible to do so against such strains; that the lateral movement or strain of the axles in passing around curves does not fall upon the bolt-connections for the car-body and truck timbers or frames, and hence all tendency to loosen such connections is avoided; that the motor is not unduly subjected to the hammering action of the wheels on the rails; that the frame D, being of light weight, adds but little dead-weight to the car, and that the truck, with the motor, is not only compact and durable, but also has in its top frame D a clear or open space above and adjacent to the wheel-axles for mounting thereon any suitable kind of motors or other appliances for propelling purposes. Furthermore, as the pedestals are always maintained in their square relation to preserve the parallelism of the axles, as above set forth, it follows that the motors partly supported thereon are entirely free from the strains and other injurious effects which are incident to any want of such parallelism occurring when the pedestals are secured to the car-sills, and hence the durability and efficiency of the motor are not affected when mounted on trucks embodying our improvements.

In this application, among other things, we have shown and claimed the broad idea of a combined car-body and seperable or independent truck, the ends of the car-body overhanging the ends of the truck, and the latter provided with a top frame of substantially rectangular form and having pedestals squared thereon, said truck-frame being rigidly secured to the car-body between its ends. In other pending applications filed by us October 2, 1888, Serial Nos. 286,957 and 286,958, we show other forms of separable or independent trucks having combined therewith some elements shown and described in this application and other elements not herein shown and described.

In application Serial No. 267,205, filed by John A. Brill March 15, 1888, among other things is shown, described, and claimed a spring-supported axle-box frame, and in joint application of G. M. Brill and J. A. Brill, Serial No. 286,957, among other things is shown, described, and broadly claimed a spring-supported axle-box frame and an electric motor partly supported on said frame and partly supported on one of the axles of the car.

We do not herein claim a truck of the kind described combined with an axle-box frame in which an electric motor is wholly or partly supported on said axle-box frame and in gear with the car axle or axles, as the same forms the subject-matter of a separate application, Serial No. 345,189, filed March 25, 1890.

What we claim is—

1. The combination of a car-body and a truck, the car-body having ends overhanging or projecting beyond the truck, and the latter being separable or independent of the car-body and having a top frame of substantially rectangular form, axle-box pedestals squared thereon, and said frame rigidly secured to the car-body sills between its ends to strengthen the sills longitudinally and prevent them from spreading, and said truck being removable from the car-body, substantially as set forth.

2. In a car of the kind described, a car-truck having a rectangular top frame of a length for location between the ends of the car-body and having openings in its sides for rigid attachment to the sills of the car-body, and pedestals for the running-gear squared on said frame, substantially as set forth.

3. In combination with a car-body, the truck-frame beams $b$ $b$, the metal frame D, united by axle-box posts or pedestals, bolts $f$, and bolt-connections $a'$ between said truck-frame and car-body, substantially as set forth.

4. In combination with a car-body, a truck-frame rigidly secured thereto and composed of top side beams $b$ $b$ and frame D, and a frame G, spring-supported on the axle-boxes for the truck and separate from the truck-frame, substantially as set forth.

In testimony whereof we affix our signatures in presence of two witnesses.

JNO. A. BRILL.
GEORGE M. BRILL.

Witnesses:
TH. RANDALL,
S. J. VAN STAVOREN.